US012319796B2

(12) United States Patent
Morfin et al.

(10) Patent No.: US 12,319,796 B2
(45) Date of Patent: Jun. 3, 2025

(54) THERMOPLASTIC POLYMER COMPOSITION FOR CONSTRUCTING 3D ARTICLES

(71) Applicant: Arkema France, Colombes (FR)

(72) Inventors: Alexis Morfin, Serquigny (FR); Jean-Charles Durand, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 35 days.

(21) Appl. No.: 17/765,725

(22) PCT Filed: Oct. 8, 2020

(86) PCT No.: PCT/FR2020/051776
§ 371 (c)(1),
(2) Date: Mar. 31, 2022

(87) PCT Pub. No.: WO2021/069843
PCT Pub. Date: Apr. 15, 2021

(65) Prior Publication Data
US 2022/0372236 A1 Nov. 24, 2022

(30) Foreign Application Priority Data
Oct. 8, 2019 (FR) ...................................... 1911146

(51) Int. Cl.
B33Y 10/00 (2015.01)
B33Y 70/10 (2020.01)
C08J 5/12 (2006.01)

(52) U.S. Cl.
CPC ............. C08J 5/121 (2013.01); B33Y 10/00 (2014.12); B33Y 70/10 (2020.01); C08J 2300/22 (2013.01); C08J 2491/06 (2013.01)

(58) Field of Classification Search
CPC .... C08J 5/121; C08J 2300/22; C08J 2491/06; B33Y 10/00; B33Y 70/10
See application file for complete search history.

(56) References Cited

U.S. PATENT DOCUMENTS

| 2005/0027050 A1 | 2/2005 | Monsheimer |
| 2005/0165210 A1 | 7/2005 | Malet et al. |
| 2006/0189784 A1 | 8/2006 | Monsheimer et al. |
| 2008/0300353 A1 | 12/2008 | Monsheimer et al. |
| 2014/0342094 A1* | 11/2014 | Hofener ............... C23C 4/12 427/446 |
| 2017/0217093 A1* | 8/2017 | DeMuth ............... B22F 12/45 |
| 2017/0226343 A1* | 8/2017 | Kim ..................... C08L 95/00 |
| 2019/0264047 A1 | 8/2019 | Rodgers et al. |
| 2020/0406538 A1* | 12/2020 | Swartz ................. B33Y 10/00 |
| 2021/0252273 A1* | 8/2021 | Slepian .............. A61M 60/178 |
| 2021/0299912 A1* | 9/2021 | Otten ................... B29B 13/10 |

FOREIGN PATENT DOCUMENTS

| CN | 102439106 A | 5/2012 |
| CN | 109563246 A | 4/2019 |
| EP | 0402883 A2 | 12/1990 |
| EP | 0405227 A2 | 1/1991 |
| EP | 0613919 A1 | 9/1994 |
| EP | 1482011 A1 | 12/2004 |
| EP | 1505099 A2 | 2/2005 |
| FR | 2846332 A1 | 4/2004 |
| JP | 2004346274 A | 12/2004 |
| JP | 2004352794 A | 12/2004 |
| JP | 2005048186 A | 2/2005 |
| WO | 0245940 A1 | 6/2002 |
| WO | 2007080338 A2 | 7/2007 |
| WO | 2018122734 A1 | 7/2018 |
| WO | 2019096806 A1 | 5/2019 |

OTHER PUBLICATIONS

International Search Report (PCT/ISA/210) with translation and Written Opinion (PCT/ISA/237) mailed on Jan. 27, 2021, by the European Patent Office as the International Searching Authority for International Application No. PCT/FR2020/051776.
First Office Action with English translation only, mailed on Jul. 1, 2023, by the China National Intellectual Property Administration for Chinese Application No. (202080081084.X), 16 pages.
Office Action issued Japanese Patent Office (JPO) on Oct. 22, 2024, in Japanese Application No. 202521120, Translation only, 4 pages.

* cited by examiner

Primary Examiner — David H Banh
(74) Attorney, Agent, or Firm — Boone IP Law

(57) ABSTRACT

The invention relates to a composition for the layer-by-layer building of a three-dimensional article by sintering of the composition brought about by electromagnetic radiation, the composition comprising a semicrystalline thermoplastic polymer powder and at least one wax, the wax having a dropping point which is greater than the crystallization temperature of the semicrystalline thermoplastic polymer, said composition in addition optionally comprising a flow agent.
The invention also relates to a process for the preparation of said composition and also to its use for the layer-by-layer building of a three-dimensional article.

19 Claims, No Drawings

THERMOPLASTIC POLYMER COMPOSITION FOR CONSTRUCTING 3D ARTICLES

FIELD OF THE INVENTION

The present invention relates to a composition for the manufacture of a three-dimensional (3D) article layer by layer, by sintering, brought about by electromagnetic radiation. More particularly, the present invention relates to a composition comprising a semicrystalline thermoplastic polymer powder and a wax and to its preparation process. The invention also relates to the use of this composition and to the articles manufactured from it.

TECHNICAL BACKGROUND

The building of 3D articles is often used to produce prototypes, models of parts ("rapid prototyping") or to produce finished parts in small series ("rapid manufacturing"), for example in the fields: automotive, nautical, aeronautical, aerospace, medical (prostheses, hearing systems, cell tissues, and the like), textiles, clothing, fashion, decoration, housings for electronics, telephony, home automation, computers, lighting, sport and industrial tools.

Among the techniques for the manufacture of 3D articles, the process of manufacture by sintering is particularly advantageous. According to this process, a layer of polymer powder is selectively and briefly irradiated in a chamber with electromagnetic radiation (for example laser beam, infrared radiation, UV radiation), the result being that the powder particles impacted by the radiation melt. The molten particles coalesce and solidify to result in the formation of a solid mass. This process can produce, in a simple way, 3D articles by repeated irradiation of a succession of freshly applied layers of powder.

The quality of the manufactured parts and also their mechanical properties depend on the characteristics of the polymer powder. Thermoplastic polymers are valued for being used for applications which are restrictive in temperature and/or mechanical, indeed even chemical, terms. Thermoplastic elastomer polymers have proved to be particularly advantageous: they combine, in one and the same polymer, mechanical properties with very good resistance to thermal aging or UV aging, as well as a low density, which thus make possible the preparation of light and flexible parts.

However, these thermoplastic polymer powders must be suitable for being employed in sintering devices.

For example, the powder has to be able to be conveyed and to form a uniform bed, without clumping or forming heaps or fissures.

The addition of an additive, such as a flow agent, can improve the flow properties to some extent.

To carry out a sintering, it is known to maintain the powder bed at a temperature within a working window, between the crystallization temperature (Ct) and the melting point (Mp) of the powder, in order to ensure good cohesion between the layers of the object during manufacture and to avoid deformation phenomena. It is thus preferable to use a polymer for which the difference between the Mp and the Ct is as great as possible, in order to widen the working window, and to thus make it easier to employ in a sintering process.

The term "working window" is understood to mean the temperature range of the powder bed at which the sintering is actually possible.

However, it has been observed that, for some powder compositions based on semicrystalline thermoplastic polymer, the sintering is not always possible even if the Mp–Ct difference of the polymer is sufficiently great. The working window can be narrow (e.g. less than 5° C.) or non-existent.

There thus exists a need to provide a composition based on thermoplastic polymer powder, in particular on thermoplastic elastomer polymer, which makes it possible to manufacture articles of good quality, having good mechanical properties and precise and well-defined dimensions and contours, in particular while making it possible to work with a wider working window, and to carry out the process more easily.

Furthermore, problems of cohesion of the powder bed during the sintering have been observed. More specifically, the parts being manufactured can sink inside the powder bed and rise on its edges, which prevents the completion of their manufacture.

It is thus sought to provide a powder composition which makes it possible to reinforce the cohesion of the bed in order to prevent the parts from sinking into the powder bed during the sintering.

There also exists a need to provide such a thermoplastic polymer powder composition having good recyclability.

The present invention makes it possible to meet the needs expressed above.

SUMMARY OF THE INVENTION

According to a first aspect, the present invention relates to a composition for the layer-by-layer building of a three-dimensional (3D) article by sintering of the composition brought about by electromagnetic radiation, the composition comprising:
  a semicrystalline thermoplastic polymer powder;
  a wax, the wax having a dropping point which is greater than the crystallization temperature (Ct) of the semicrystalline thermoplastic polymer;
  and optionally a flow agent.

According to a particularly advantageous embodiment, the semicrystalline thermoplastic polymer (sc TP) is an elastomer.

The composition of the present invention makes it possible to build 3D articles exhibiting a good definition and a uniformity over the whole of the part regarding its physical, mechanical, indeed even chemical, properties.

According to one embodiment of the invention, the sc TP polymer is chosen from:
  a polyamide,
  a homopolymer or copolymer of vinylidene fluoride (PVDF),
  a copolymer comprising polyamide blocks and comprising polyether blocks (PEBA),
  a thermoplastic polyurethane (TPU),
  a copolymer comprising polyester blocks and comprising polyether blocks (COPE), and
  their mixtures.

Preferably, the sc TP polymer is an elastomer, chosen from:
  a PEBA,
  a TPU,
  a COPE, and
  their mixtures.

The wax can be chosen in particular from polyolefin waxes, waxes of vegetable or animal origin, and also their mixtures; for example, the wax can be chosen from polyethylene and polypropylene waxes, polytetrafluoroethylene waxes, ketone waxes, acid waxes, partially esterified acid waxes, acid anhydride waxes, ester waxes, aldehyde waxes, amide waxes, their derivatives and also their mixtures.

The invention also relates to a process for the preparation of the composition described above, comprising:
- supplying a sc TP polymer, preferably in the powder form, and
- bringing the sc TP polymer into contact with a wax and optionally the flow agent.

According to one embodiment, the operation of bringing the sc TP polymer into contact with the wax is carried out by dry mixing.

According to one embodiment, the operation of bringing the sc TP polymer into contact with the wax is carried out:
- by dissolving the wax in a suitable solvent, in order to form a wax solution;
- by mixing said wax solution with the sc TP polymer, in order to form a dispersion; and
- by removing the solvent from said dispersion, for example by evaporation, in order to obtain the wax-coated sc TP polymer.

The invention also relates to the use of the composition described above for the layer-by-layer building of a 3D article by sintering of the composition brought about by electromagnetic radiation, preferably by laser radiation.

The invention also relates to a 3D article manufactured from the composition described above, preferably by layer-by-layer building by sintering brought about by electromagnetic radiation, preferably by laser radiation.

In the context of the present invention, it has been observed that the use of the wax in the composition increases the width of the working window, compared to the same composition without wax, and thus makes it possible to carry out manufacture by sintering with a wide choice of compositions based on sc TP polymer, even those with a narrow or non-existent working window.

This is particularly advantageous in the case where the composition additionally comprises a flow agent.

Furthermore, it has been observed that the use of the wax makes it possible to increase the cohesion of the powder bed during sintering, and thus to prevent the manufactured parts from sinking inside the powder bed and deforming. This constitutes another advantage of the present invention.

Thus, according to another aspect, the invention relates to the use of a wax to increase the cohesion of the bed of sc TP polymer powder in a process of sintering by electromagnetic radiation, preferably by laser radiation.

The composition according to the invention additionally exhibits good recyclability.

Without wishing to be committed to a particular theory, it seems that the wax, at the temperature of the powder bed, adheres to the polymer particles, which makes it possible for the cohesion of the powder bed to increase; once the sintering has been carried out, and when the temperature of the powder bed has decreased, the wax stiffens and separates from the unsintered polymer particles, which makes it possible to recycle them and to reuse them.

According to one aspect, the invention relates to the use of a particular wax in a powder composition based on sc TP polymer to improve the recyclability of powders in a building of 3D articles by sintering.

According to another aspect, the invention relates to a process for building articles by sintering using a composition as described above, where the process comprises a stage of recycling the unsintered powders.

According to one embodiment, the composition is reused in several successive build-ups.

According to yet another aspect, the invention relates to the 3D article obtained from a composition comprising recycled sc TP polymer powders.

Semicrystalline Thermoplastic Polymer

The thermoplastic polymer according to the invention is semicrystalline. The term "semicrystalline thermoplastic polymer" is understood to mean a thermoplastic polymer which exhibits:
- a crystallization temperature (Ct) determined, according to the standard ISO 11357-3:2013, during the stage of cooling at a rate of 20 K/min in DSC (differential scanning calorimetry);
- a melting point (Mp) determined, according to the standard ISO 11357-3:2013, during the stage of heating at a rate of 20 K/min in DSC; and
- an enthalpy of fusion ($\Delta Hf$) determined, according to the standard ISO 11357-3:2013, during the stage of heating at a rate of 20 K/min in DSC, which is greater than 5 J/g, preferably greater than 10 J/g, for example greater than 20 J/g, and is generally less than 200 J/g, preferably less than 150 J/g, for example less than 100 J/g, or less than 50 J/g.

The semicrystalline thermoplastic polymer of the invention can have a Mp of 100 to 300° C. and preferably of 120 to 200° C. This Mp corresponds to the first heating. The sc TP polymer can have a Ct of 40 to 250° C. and preferably of 45 to 200° C., for example of 45 to 150° C.

Typically, the Mp and Ct are determined directly from the sc TP powder.

When a mixture of polymers is concerned, the lowest Mp in the mixture of polymers is regarded as the Mp and the highest Ct in the mixture of polymers is regarded as the Ct.

The difference between the Ct and the Mp of the sc TP polymer is preferably greater than or equal to 20° C., preferably greater than or equal to 30° C., more preferably greater than or equal to 40° C., or greater than or equal to 50° C., or greater than or equal to 60° C., or greater than or equal to 70° C., or greater than or equal to 80° C.

The sc TP polymer of the invention can in particular be chosen from polyamides, PVDF, PEBA, TPU, COPE and their mixtures.

Polyamide

According to one embodiment, the semicrystalline thermoplastic polymer is a semicrystalline polyamide (sc PA). It can be a homopolyamide or a copolyamide, or also a mixture of these.

Thus, the polyamide according to the invention can be obtained by the polymerization of one monomer (homopolyamide) or of at least two different monomers (copolyamide) chosen from:
- monomers of amino acid or aminocarboxylic acid type and preferably α,ω-aminocarboxylic acids;
- monomers of lactam type having from 3 to 18 carbon atoms in the main ring and which can be substituted;
- monomers of "diamine.diacid" type resulting from the reaction between an aliphatic diamine having from 4 to 36 carbon atoms, preferably from 4 to 18 carbon atoms, and a dicarboxylic acid having from 4 to 36 carbon atoms, preferably from 4 to 18 carbon atoms; and
- their mixtures, with monomers having a different carbon number in the case of mixtures between a monomer of amino acid type and a monomer of lactam type.

In the present description, the term "monomer" should be taken with the meaning of "repeat unit". This is because the case where a repeat unit of the polyamide (PA) consists of the combination of a diacid with a diamine is particular. It is considered that it is the combination of a diamine and of a diacid, that is to say the diamine.diacid pair (in an equimolar amount), which corresponds to the monomer. This is explained by the fact that, individually, the diacid or the diamine is only a structural unit, which is not enough in itself alone to be polymerized.

As regards the monomers of amino acid type, mention may be made, as examples of α,ω-amino acids, of those having from 4 to 18 carbon atoms, such as aminocaproic, 7-aminoheptanoic, 11-aminoundecanoic, N-heptyl-11-aminoundecanoic and 12-aminododecanoic acids.

As regards the monomers of lactam type, mention may be made, by way of examples, of those having from 3 to 18 carbon atoms on the main ring and which can be substituted. Mention may be made, for example, of β,β-dimethylpropiolactam, α,α-dimethylpropiolactam, amylolactam, caprolactam, also known as lactam 6, capryllactam, also known as lactam 8, oenantholactam and lauryllactam, also known as lactam 12.

As regards the monomers of "diamine.diacid" type:
Mention may be made, as examples of dicarboxylic acids, of the acids having from 4 to 36 carbon atoms. Mention may be made, for example, of adipic acid, sebacic acid, azelaic acid, suberic acid, isophthalic acid, butanedioic acid, 1,4-cyclohexanedicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid HOOC—$(CH_2)_{10}$—COOH and tetradecanedioic acid.

The term "fatty acid dimers" or "dimerized fatty acids" is more particularly understood to mean the product of the dimerization reaction of fatty acids (generally containing 18 carbon atoms, often a mixture of oleic and/or linoleic acid). It is preferably a mixture comprising from 0% to 15% of $C_{18}$ monoacids, from 60% to 99% of $C_{36}$ diacids, and from 0.2% to 35% of $C_{54}$ or more triacids or polyacids.

As examples of diamines, mention may be made of aliphatic diamines having from 4 to 36 atoms, preferably from 4 to 18 atoms, which may be arylic and/or saturated cyclic. Mention may be made, by way of examples, of hexamethylenediamine, piperazine (abbreviated to "Pip"), aminoethylenepiperazine, tetramethylenediamine, octamethylenediamine, decamethylenediamine, dodecamethylenediamine, 1,5-diaminohexane, 2,2,4-trimethyl-1,6-diaminohexane, polyol diamines, isophoronediamine (IPD), methylpentamethylenediamine (MPMD), bis(aminocyclohexyl)methane (BACM), bis(3-methyl-4-aminocyclohexyl)methane (BMACM), bis(p-aminocyclohexyl)methane, commonly denoted "PACM", meta-xylylenediamine and bis(p-aminocyclohexyl)methane.

Mention may more particularly be made, as examples of diamines.diacids, of those resulting from the condensation of 1,6-hexamethylenediamine with a dicarboxylic acid having from 6 to 36 carbon atoms and those resulting from the condensation of 1,10-decamethylenediamine with a diacid having from 6 to 36 carbon atoms. Mention may in particular be made, as examples of monomers of "diamine.diacid" type, of the monomers: 66, 610, 611, 612, 614 and 618. Mention may be made of monomers resulting from the condensation of decanediamine with a $C_6$ to $C_{36}$ diacid, in particular the monomers: 1010, 1012, 1014 and 1018. In the numeral notation XY, X represents the number of carbon atoms resulting from the diamine residues and Y represents the number of carbon atoms resulting from the diacid residues, in a conventional way.

The homopolyamide is typically an aliphatic homopolyamide, preferably a linear aliphatic homopolyamide.

The copolyamide can be aliphatic, aromatic or semiaromatic.

According to one embodiment, the sc PA is a semiaromatic copolyamide, for example of formula X/YAr, as described in EP1505099, in particular of formula A/XT in which A is chosen from a unit obtained from an amino acid, a unit obtained from a lactam and a unit corresponding to the (diamine.diacid) formula.

Mention may be made, as examples of (co)polyamides, of: PA 410, PA 4T, PA 66, PA 46, PA 610, PA 612, PA 11, PA 12, PA 910, PA 912, PA 913, PA 914, PA 915, PA 916, PA 918, PA 936, PA 1010, PA 1012, PA 1013, PA 1014, PA 1210, PA 1212, PA 1213, PA 1214, PA 614, PA 613, PA 615, PA 616, PA 618, PA MXD6, PA MXD10, PA 12T, PA 10T, PA 9T, PA 18T, PA 6T/66, PA 66/6T/6I and PA 6/6T. XT denotes a unit obtained from the polycondensation of a $C_x$ diamine and terephthalic acid, with x representing the number of carbon atoms of the $C_x$ diamine, x being between 6 and 36, advantageously between 9 and 18, in particular a polyamide of formula A/6T, A/9T, A/10T or A/11T, A being as defined above, in particular a polyamide chosen from MPMDT/6T, 5T/10T, 11/BACT, 11/6T/10T, MXDT/10T, MPMDT/10T, BACT/10T, BACT/6T, BACT/10T/6T, 11/BACT/6T, 11/MPMDT/6T, 11/MPMDT/10T, 11/BACT/10T, 11/MXDT/10T and 11/5T/10T, T corresponding to terephthalic acid, MXD corresponding to m-xylylenediamine, MPMD corresponding to methylpentamethylenediamine and BAC corresponding to bis(aminomethyl)cyclohexane.

According to a preferred embodiment, the polyamide is chosen from polyamide (PA) 11, PA 12 or PA 6.

The homopolyamide or the copolyamide in the context of the invention is a sc TP polymer having a Ct, a Mp and a ΔHf as defined above.

Vinylidene Fluoride Polymer (PVDF)

According to one embodiment, the semicrystalline thermoplastic polymer is a PVDF.

The PVDF can be a homopolymer or a copolymer.

The term "copolymer" here designates generically the polymers obtained by polymerization of VDF with at least one other comonomer, i.e. polymers having repeat units resulting from VDF and from at least one other comonomer. Preferably, it is a copolymer in the strict sense, that is to say having repeat units resulting from VDF and from just one other comonomer.

Preferably, the comonomer (or comonomers) is a halogenated alkene and more preferably a fluorinated alkene. Mention may in particular be made of halogenated propenes or ethylenes and more particularly fluoroethylene (or vinyl fluoride), chlorofluoroethylenes (1-chloro-1-fluoroethylene and 1-chloro-2-fluoroethylene), trifluoroethylene, chlorodifluoroethylenes (in particular 1-chloro-2,2-difluoroethylene), 1-bromo-2,2-difluoroethylene, bromotrifluoroethylene, chlorotrifluoroethylene, tetrafluoroethylene, trifluoropropenes (in particular 3,3,3-trifluoropropene), tetrafluoropropenes (in particular 2,3,3,3-tetrafluoropropene), chlorotrifluoropropenes (in particular 2-chloro-3,3,3-trifluoropropene), pentafluoropropenes (in particular 1,1,3,3,3-pentafluoropropene or 1,2,3,3,3-pentafluoropropene) and hexafluoropropene, also called hexafluoropropylene. It can also be a perfluoroalkyl vinyl ether, of general formula $R_f$—O—CF—$CF_2$, $R_f$ being an alkyl group, preferably a $C_1$ to $C_4$ alkyl group. Preferred examples are PPVE (perfluoropropyl vinyl ether) and PMVE (perfluoromethyl vinyl ether).

The PVDF can be obtained by known polymerization methods, such as solution, emulsion or suspension polymerization. According to one embodiment, it is prepared by an emulsion polymerization process in the absence of a fluorinated surface-active agent.

The PVDF, when it is a copolymer, can be homogeneous or heterogeneous, and preferably homogeneous. A homogeneous copolymer exhibits a uniform chain structure, the statistical distribution of the comonomers not varying between the polymer chains. In a heterogeneous copolymer, the polymer chains exhibit a distribution as mean content of comonomers of multimodal or spread-out type: it thus comprises polymer chains rich in one comonomer and polymer chains poor in said comonomer. An example of heterogeneous PVDF appears in the document WO 2007/080338.

A homogeneous copolymer can be prepared by a one-stage process, in which the comonomers are gradually injected while keeping a mass ratio between them constant.

According to a preferred embodiment, the polymer is a sc TP elastomer polymer chosen from a PEBA copolymer, a TPU or a COPE.

Preferably, the thermoplastic elastomer exhibits an instantaneous hardness of less than or equal to 40 Shore D, more preferably of less than or equal to 35 Shore D. The hardness measurements can be carried out according to the standard ISO 868:2003.

Copolymer Comprising Polyamide Blocks and Comprising Polyether Blocks (PEBA)

According to one embodiment, the semicrystalline thermoplastic polymer is a "PEBA" copolymer; it can preferably be a linear (noncrosslinked) copolymer.

PEBAs result from the polycondensation of polyamide blocks comprising reactive end groups with polyether blocks comprising reactive end groups, such as, inter alia, the polycondensation:
1) of polyamide blocks comprising diamine chain ends with polyoxyalkylene blocks comprising dicarboxyl chain ends;
2) of polyamide blocks comprising dicarboxyl chain ends with polyoxyalkylene blocks comprising diamine chain ends, which are obtained, for example, by cyanoethylation and hydrogenation of aliphatic α,ω-dihydroxylated polyoxyalkylene blocks, known as polyetherdiols;
3) of polyamide blocks comprising dicarboxyl chain ends with polyetherdiols, the products obtained being, in this specific case, polyetheresteramides.

The polyamide blocks comprising dicarboxyl chain ends originate, for example, from the condensation of polyamide precursors in the presence of a chain-limiting dicarboxylic acid. The polyamide blocks comprising diamine chain ends originate, for example, from the condensation of polyamide precursors in the presence of a chain-limiting diamine.

Three types of polyamide blocks can advantageously be used.

According to a first type, the polyamide blocks originate from the condensation of a dicarboxylic acid, in particular those having from 4 to 20 carbon atoms, preferably those having from 6 to 18 carbon atoms, and of an aliphatic or aromatic diamine, in particular those having from 2 to 20 carbon atoms, preferably those having from 6 to 14 carbon atoms.

Mention may be made, as examples of dicarboxylic acids, of butanedioic acid, adipic acid, azelaic acid, suberic acid, sebacic acid, dodecanedicarboxylic acid, octadecanedicarboxylic acid and terephthalic and isophthalic acids, but also dimerized fatty acids.

Mention may be made, as examples of diamines, of tetramethylenediamine, hexamethylenediamine, 1,10-decamethylenediamine, dodecamethylenediamine and trimethylhexamethylenediamine.

Advantageously, polyamide blocks PA 412, PA 414, PA 418, PA 610, PA 612, PA 614, PA 618, PA 912, PA 1010, PA 1012, PA 1014 and PA 1018 are used.

In the PA XY notation, X represents the number of carbon atoms resulting from the diamine residues and Y represents the number of carbon atoms resulting from the diacid residues, in a conventional way.

According to a second type, the polyamide blocks result from the condensation of one or more α,ω-aminocarboxylic acids and/or of one or more lactams having from 6 to 12 carbon atoms. Mention may be made, as examples of lactams, of caprolactam, oenantholactam and lauryllactam. Mention may be made, as examples of α,ω-aminocarboxylic acids, of aminocaproic acid, 7-aminoheptanoic acid, 11-aminoundecanoic acid and 12-aminododecanoic acid.

Advantageously, the polyamide blocks of the second type are PA 11 (polyundecanamide), PA 12 (polydodecanamide) or PA 6 (polycaprolactam) blocks. In the PA X notation, X represents the number of carbon atoms resulting from the amino acid residues.

The condensation according to this type can be carried out in the presence of a chain limiter, for example a dicarboxylic acid having from 4 to 12 carbon atoms or a diamine.

According to a third type, the polyamide blocks result from the condensation of at least one α,ω-aminocarboxylic acid (or one lactam), at least one diamine and at least one dicarboxylic acid.

In this case, the polyamide PA blocks are prepared by polycondensation:
of the linear aliphatic or aromatic diamine(s) containing X carbon atoms;
of the dicarboxylic acid(s) containing Y carbon atoms; and
of the comonomer(s) {Z}, chosen from lactams and α,ω-aminocarboxylic acids containing Z carbon atoms and equimolar mixtures of at least one diamine containing X1 carbon atoms and of at least one dicarboxylic acid containing Y1 carbon atoms, (X1, Y1) being different from (X, Y),
said comonomer(s) {Z} being introduced in a weight proportion advantageously ranging up to 50%, preferably up to 20%, even more advantageously up to 10% relative to the total amount of polyamide-precursor monomers;
in the presence of a chain limiter chosen from dicarboxylic acids.

Advantageously, the dicarboxylic acid containing Y carbon atoms is used as chain limiter, which is introduced in excess relative to the stoichiometry of the diamine(s). According to one variant of this third type, the polyamide blocks result from the condensation of at least two α,ω-aminocarboxylic acids or from at least two lactams containing from 6 to 12 carbon atoms or from one lactam and one aminocarboxylic acid not having the same number of carbon atoms, in the optional presence of a chain limiter.

As examples of aliphatic α,ω-aminocarboxylic acids, mention may be made of aminocaproic acid, 7-aminoheptanoic acid, 11-aminoundecanoic acid and 12-aminododecanoic acid.

As examples of lactams, mention may be made of caprolactam, oenantholactam and lauryllactam.

As examples of aliphatic diamines, mention may be made of hexamethylenediamine, dodecamethylenediamine and trimethylhexamethylenediamine.

As examples of aliphatic diacids, mention may be made of butanedioic acid, adipic acid, azelaic acid, suberic acid, sebacic acid, dodecanedicarboxylic acid and dimerized fatty acids. These dimerized fatty acids preferably have a dimer content of at least 98%; preferably, they are hydrogenated; they are, for example, the products sold under the Pripol® brand name by Croda or under the Empol® brand name by BASF or under the Radiacid® brand name by Oleon, and polyoxyalkylene-α,ω-diacids.

Mention may be made, as examples of aromatic diacids, of terephthalic acid (T) and isophthalic acid (I).

Mention may be made, as examples of polyamide blocks of the third type, of the following:
  PA 66/6, where 66 denotes hexamethylenediamine units condensed with adipic acid and 6 denotes units resulting from the condensation of caprolactam;
  PA 66/610/11/12, where 66 denotes hexamethylenediamine condensed with adipic acid, 610 denotes hexamethylenediamine condensed with sebacic acid, 11 denotes units resulting from the condensation of aminoundecanoic acid, and 12 denotes units resulting from the condensation of lauryllactam.

The notations PA X/Y, PA X/Y/Z, and the like, relate to copolyamides in which X, Y, Z, and the like, represent homopolyamide units as described above.

Advantageously, the polyamide blocks of the copolymer used in the invention comprise blocks of polyamide PA 6, PA 11, PA 12, PA 54, PA 59, PA 510, PA 512, PA 513, PA 514, PA 516, PA 518, PA 536, PA 64, PA 69, PA 610, PA 612, PA 613, PA 614, PA 616, PA 618, PA 636, PA 104, PA 109, PA 1010, PA 1012, PA 1013, PA 1014, PA 1016, PA 1018, PA 1036, PA 10T, PA 124, PA 129, PA 1210, PA 1212, PA 1213, PA 1214, PA 1216, PA 1218, PA 1236, PA 12T, or mixtures or copolymers of these; and preferably comprise blocks of polyamide PA 6, PA 11, PA 12, PA 610, PA 1010, PA 1012, or mixtures or copolymers of these.

The polyether blocks consist of alkylene oxide units.

The polyether blocks can in particular be blocks resulting from PEG (polyethylene glycol), that is to say consisting of ethylene oxide units, and/or blocks resulting from PPG (propylene glycol), that is to say consisting of propylene oxide units, and/or blocks resulting from PO3G (polytrimethylene glycol), that is to say consisting of polytrimethylene glycol ether units, and/or blocks resulting from PTMG, that is to say consisting of tetramethylene glycol, also called polytetrahydrofuran, units. The PEBA copolymers can comprise several types of polyethers in their chain, it being possible for the copolyethers to be block or random.

Use may also be made of blocks obtained by oxyethylation of bisphenols, such as, for example, bisphenol A. These latter products are described in particular in the document EP 613919.

The polyether blocks can also consist of ethoxylated primary amines. Mention may be made, as examples of ethoxylated primary amines, of the products of formula:

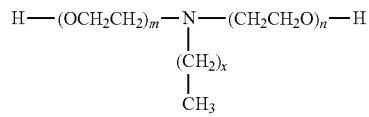

in which m and n are integers between 1 and 20 and x is an integer between 8 and 18. These products are, for example, commercially available under the Noramox® brand name from CECA and under the Genamin® brand name from Clariant.

The polyether blocks can comprise polyoxyalkylene blocks comprising $NH_2$ chain ends, it being possible for such blocks to be obtained by cyanoacetylation of aliphatic α,ω-dihydroxylated polyoxyalkylene blocks, known as polyetherdiols. More particularly, the Jeffamine or Elastamine commercial products can be used (for example, Jeffamine® D400, D2000, ED 2003 or XTJ 542, which are commercial products from Huntsman, also described in the documents JP 2004346274, JP 2004352794 and EP 1482011).

The polyetherdiol blocks are either used as is and copolycondensed with polyamide blocks comprising carboxyl end groups, or aminated in order to be converted into polyetherdiamines and condensed with polyamide blocks comprising carboxyl end groups.

A general method for the two-stage preparation of PEBA copolymers having ester bonds between the PA blocks and the PE blocks is known and is described, for example, in the document FR 2846332. A general method for the preparation of PEBA copolymers having amide bonds between the PA blocks and the PE blocks is known and described, for example, in the document EP 1482011. The polyether blocks can also be mixed with polyamide precursors and a diacid chain limiter in order to prepare polymers comprising polyamide blocks and polyether blocks having randomly distributed units (one-stage process).

Of course, the designation PEBA in the present description of the invention relates just as well to the PEBAX® products sold by Arkema, to the Vestamid® products sold by Evonik®, to the Grilamid® products sold by EMS, as to the PEBA-type Pelestat® products sold by Sanyo or to any other PEBA from other suppliers. While the block copolymers described above generally comprise at least one polyamide block and at least one polyether block, the present invention also covers all the copolymers comprising two, three, four (indeed even more) different blocks chosen from those described in the present description, provided that these blocks comprise at least polyamide and polyether blocks.

For example, the copolymer according to the invention can comprise a segmented block copolymer comprising three different types of blocks (or "triblock" copolymer), which results from the condensation of several of the blocks described above. Said triblock is preferably chosen from copolyetheresteramides and copolyetheramideurethanes.

PEBA copolymers which are particularly preferred in the context of the invention are the copolymers comprising blocks of the following types: PA 11 and resulting from PEG; PA 11 and resulting from PTMG; PA 12 and resulting from PEG; PA 12 and resulting from PTMG; PA 1010 and resulting from PEG; PA 1010 and resulting from PTMG; PA 610 and resulting from PTMG; PA 610 and resulting from PEG; PA 6 and resulting from PEG; PA 6 and resulting from PTMG.

The number-average molar mass of the polyamide blocks in the PEBA copolymer preferably ranges from 100 to 20 000 g/mol, more preferentially from 200 to 10 000 g/mol and more preferentially still from 200 to 2000 g/mol. In embodiments, the number-average molar mass of the polyamide blocks in the PEBA copolymer has a value from 100 to 200 g/mol, or from 200 to 500 g/mol, or from 500 to 1000 g/mol, or from 1000 to 1500 g/mol, or from 1500 to 2000 g/mol, or from 2000 to 2500 g/mol, or from 2500 to 3000 g/mol, or from 3000 to 3500 g/mol, or from 3500 to 4000 g/mol, or from 4000 to 5000 g/mol, or from 5000 to 6000 g/mol, or from 6000 to 7000 g/mol, or from 7000 to 8000 g/mol, or from 8000 to 9000 g/mol, or from 9000 to 10 000 g/mol, or from 10 000 toll 000 g/mol, or from 11 000 to 12 000 g/mol, or from 12 000 to 13 000 g/mol, or from 13 000 to 14 000 g/mol, or from 14 000 to 15 000 g/mol, or from 15 000 to 16 000 g/mol, or from 16 000 to 17 000 g/mol, or from 17 000 to 18 000 g/mol, or from 18 000 to 19 000 g/mol, or from 19 000 to 20 000 g/mol.

The number-average molar mass of the polyether blocks has a value preferably from 100 to 6000 g/mol, more preferentially from 200 to 3000 g/mol and more preferentially still from 800 to 2500 g/mol. In embodiments, the number-average molar mass of the polyether blocks has a value from 100 to 200 g/mol, or from 200 to 500 g/mol, or from 500 to 800 g/mol, or from 800 to 1000 g/mol, or from 1000 to 1500 g/mol, or from 1500 to 2000 g/mol, or from 2000 to 2500 g/mol, or from 2500 to 3000 g/mol, or from 3000 to 3500 g/mol, or from 3500 to 4000 g/mol, or from 4000 to 4500 g/mol, or from 4500 to 5000 g/mol, or from 5000 to 5500 g/mol, or from 5500 to 6000 g/mol.

The number-average molar mass is set by the content of chain limiter. It can be calculated according to the relationship:

$$M_n = n_{monomer} \times MW_{repeat\ unit}/n_{chain\ limiter} \times MW_{chain\ limiter}$$

In this formula, $n_{monomer}$ represents the number of moles of monomer, $n_{chain\ limiter}$ represents the number of moles of limiter (for example diacid) in excess, $MW_{repeat\ unit}$ represents the molar mass of the repeat unit and $MW_{chain\ limiter}$ represents the molar mass of the limiter (for example diacid) in excess.

The number-average molar mass of the polyamide blocks and of the polyether blocks can be measured before the copolymerization of the blocks by gel permeation chromatography (GPC).

The ratio by weight of the polyamide blocks with respect to the polyether blocks of the PEBA copolymer can in particular have a value from 0.1 to 20. This ratio by weight can be calculated by dividing the number-average molar mass of the polyamide blocks by the number-average molar mass of the polyether blocks.

Thus, the ratio by weight of the polyamide blocks with respect to the polyether blocks of the PEBA copolymer can be from 0.1 to 0.2; or from 0.2 to 0.3; or from 0.3 to 0.4; or from 0.4 to 0.5; or from 0.5 to 1; or from 1 to 2; or from 2 to 3; or from 3 to 4; or from 4 to 5; or from 5 to 7; or from 7 to 10; or from 10 to 13; or from 13 to 16; or from 16 to 19; or from 19 to 20.

Ranges from 2 to 19 and more specifically from 4 to 10 are particularly preferred.

Copolymer Comprising Polyester Blocks and Comprising Polyether Blocks (COPE)

According to one embodiment, the sc TP polymer is a COPE, also called copolyetherester.

The COPEs according to the invention thus include any thermoplastic elastomer polymer comprising at least one polyether (PE) block and at least one polyester PES block (homopolymer or copolyester).

The COPEs comprise flexible PE blocks resulting from polyetherdiols and rigid polyester blocks which result from the reaction of at least one dicarboxylic acid with at least one chain-extending short diol unit. The PES blocks and the PE blocks are connected via ester bonds resulting from the reaction of the acid functional groups of the dicarboxylic acid with the OH functional groups of the polyetherdiol. The chain-extending short diol can be chosen from the group consisting of neopentyl glycol and aliphatic glycols of formula $HO(CH_2)_nOH$ in which n is an integer having a value from 2 to 10. The linking of the polyethers and diacids forms the flexible blocks while the linking of the glycol or butanediol with the diacids forms the rigid blocks of the copolyetherester. Advantageously, the diacids are aromatic dicarboxylic acids having from 8 to 14 carbon atoms. Up to 50 mol % of the aromatic dicarboxylic acid can be replaced by at least one other aromatic dicarboxylic acid having from 8 to 14 carbon atoms, and/or up to 20 mol % can be replaced by an aliphatic dicarboxylic acid having from 2 to 14 carbon atoms. Mention may be made, as examples of aromatic dicarboxylic acids, of terephthalic acid, isophthalic acid, dibenzoic acid, naphthalenedicarboxylic acid, 4,4'-diphenylenedicarboxylic acid, bis(p-carboxyphenyl)methane acid, ethylenebis(p-benzoic acid), 1,4-tetramethylenebis(p-oxybenzoic acid), ethylenebis(p-oxybenzoic acid) or 1,3-trimethylenebis(p-oxybenzoic acid). Mention may be made, as examples of glycols, of ethylene glycol, 1,3-trimethylene glycol, 1,4-tetramethylene glycol, 1,6-hexamethylene glycol, 1,3-propylene glycol, 1,8-octamethylene glycol or 1,10-decamethylene glycol. COPEs are copolymers having PE units derived from polyetherdiols as defined above, for example polyethylene glycol (PEG), polypropylene glycol (PPG), polytrimethylene glycol (PO3G) or polytetramethylene glycol (PTMG), and PES units resulting from the reaction of a dicarboxylic acid, such as terephthalic acid, with a glycol, ethanediol or 1,4-butanediol. Such copolyetheresters are described in the patents EP402883 and EP405227.

Thermoplastic Polyurethane (TPU)

According to one embodiment, the semicrystalline thermoplastic polymer is a TPU, i.e. a copolymer comprising polyurethane (PU) blocks and polyether (PE) blocks, also called polyetherurethane.

TPUs result from the condensation of flexible PE blocks, which are polyetherdiols, and rigid PU blocks. The PU blocks and the PE blocks are connected via bonds resulting from the reaction of the isocyanate functional groups of the polyurethane with the —OH functional groups of the polyetherdiol.

The term "PU" within the meaning of the invention is understood to mean the products resulting from the reaction of at least one diisocyanate, which can be chosen from aromatic diisocyanates (e.g.: MDI, TDI) and/or aliphatic diisocyanates (e.g.: HDI or hexamethylene diisocyanate), with at least one short diol. This chain-extending short diol can be chosen from the glycols mentioned above in the description of the copolyetheresters. The PUs participating in the composition of the copolymers according to the invention can comprise all types of polyols and in particular those of renewable origin, such as polyols resulting from starch (erythritol, sorbitol, maltitol, mannitol), polyols resulting from sugars, such as sucrose (isomalt, xylitol) or polyols resulting from corn, soya, cotton, rape, sunflower or peanut (glycerol, propylene glycol, ethylene glycol, reaction co-product of biodiesel production). Mention may also be made, as other examples of polyols which can participate in the composition of these polyurethanes, of polyethylene glycol (PEG), poly(1,2-propylene glycol) (PPG), poly(1,3-propylene glycol) (PO3G) or polytetramethylene glycol (PTMG).

According to one embodiment, the semicrystalline thermoplastic elastomer polymer can also be chosen from copolymers comprising styrene blocks (TPSs), thermoplastic polyolefin elastomers (TPOs) or thermoplastic vulcanizates (TPVs). Examples of commercial materials originating from commercial thermoplastic elastomer polymers are, for example, the products Cawiton®, Thermolast K®, Thermolast M®, Sofprene®, Dryflex® and Laprene® (TPSs), Desmopan® or Elastollan® (TPUs), Santoprene®, Termoton®, Solprene®, Thermolast V®, Vegaprene®, or Forprene® (TPVs), and For-Tec E® or Engage, Ninjaflex® (TPOs).

According to one embodiment, the semicrystalline thermoplastic polymer is a polymer chosen from polyoxymethylene (POM) homopolymers and copolymers, polyethylene (PE), polypropylene (PP), polyethylene terephthalate (PET), polybutylene terephthalate (PBT), polyphthalamides (PPAs) and poly(p-phenylene terephthalamide).

Wax

The wax of the invention is generally a solid compound at ambient temperature.

The wax can be malleable at 20° C.

The wax can exhibit a coarse to fine crystal structure, of appearance translucent to opaque but not glassy. The wax can begin to melt above 40° C. without decomposing. The wax can exhibit a melt viscosity (of less than 10 000 mPa.$) at 10° C. above its dropping point.

The wax can be a hydrophobic compound.

The wax used in the invention can in particular be chosen from synthetic waxes, such as polyolefin waxes, waxes of mineral origin (e.g. montan wax), petroleum origin, vegetable origin (e.g. carnauba wax or candelilla wax) or animal origin, as well as their mixtures.

The wax as mentioned above generally consists of hydrocarbon compounds comprising from 10 to 100 carbon atoms, preferably from 15 to 60 carbon atoms. According to a particularly advantageous embodiment, the wax is a functionalized wax of the abovementioned type which can comprise at least one polar group chosen from an ester, an ether, an acid, an acid anhydride, a carboxylate, an amide, an amine or an alcohol, preferably an ester, an acid, an acid anhydride or an amide. The acid group is typically a carboxylic acid.

A functionalized wax can be obtained by functionalization of an existing wax, in particular by an oxidation reaction or grafting reaction. Alternatively, the functionalized wax can be obtained by introducing monomers carrying functional groups during the polymerization reaction.

Without wishing to be committed to a particular theory, it seems that these polar groups are likely to interact with the sc TP polymer, creating a weak bond on the surfaces of the sc TP polymer powder, for example of hydrogen or Van der Waals type, which makes it possible to improve the cohesion of the powder and to increase the hardness of the powder bed, in particular at the build temperature.

Preferably, the wax used in the context of the invention has an acid number ranging from 2 to 100, preferably from 3 to 90, mg KOH/g, for example ranging from 2 to 10, or from 10 to 20, or from 20 to 50, or from 50 to 90, mg KOH/g. When a sc TP polymer of the polyamide or PEBA type is employed in the context of the present invention, it has been observed that, the higher the acid number of the wax, the greater the cohesion of the powder bed for the waxes having similar dropping points.

In the context of the invention, the acid number was measured according to the standard DIN EN ISO 2114—November 2000, using a 50:50 v/v xylene/ethanol mixture as titration solvent.

The 1 g wax sample was weighed into a 250 ml Erlenmeyer flask and dissolved in 100 ml of the hot xylene/ethanol mixture (approximately 90° C.) on a magnetic stirrer. The sample was subsequently placed on the magnetic stirrer 20 of the titrimeter, the electrode was thoroughly immersed and the mixture was titrated with an ethanolic KOH solution at a concentration of 0.1 M.

According to one embodiment, the wax can be chosen from polyethylene and polypropylene waxes, polytetrafluoroethylene waxes, ketone waxes, acid waxes, partially esterified acid waxes, acid anhydride waxes, ester waxes, aldehyde waxes, amide waxes, their derivatives and also their mixtures, preferably polyethylene and polypropylene waxes, acid waxes, partially esterified acid waxes, acid anhydride waxes, ester waxes, amide waxes, their derivatives and/or their mixtures.

The waxes can typically be mixed in the dry state or in the molten state.

The polyolefin waxes can be ethylene and/or propylene and/or 1-butene homopolymers. The polyolefin waxes can be copolymers of at least two olefins (for example, polymers of mixtures of ethylene, propylene and/or 1-butene). They can also be copolymers of ethylene and propylene. According to one embodiment, the polyolefins can be linear or branched polyolefins having from 20 to 200 carbon atoms and preferably from 40 to 100 carbon atoms. They can also be substituted by aliphatic and/or aromatic groups. Examples of such polyolefins include 1-hexene, 1-octene or 1-octadecene, styrene. For example, a polyolefin wax used in the context of this invention is the wax "Crayvallac WN1495®" sold by Arkema.

A polytetrafluoroethylene wax which can be used in the context of the invention is the wax "Ceridust 9202F®" sold by Clariant or the wax "Crayvallac WF-1000®" sold by Arkema.

An acid wax which can be used in the context of the invention is the wax "Licowax S®" sold by Clariant.

An ester wax which can be used in the context of the invention is the polyhydroxyalkanoate wax, for example the wax "Ceraflour 1000C)" sold by Byk and the wax "Licowax OP®" sold by Clariant.

According to one embodiment, the wax can be a wax derived from crude oil, such as paraffins. Paraffin waxes contain essentially straight-chain hydrocarbons and can also contain branched hydrocarbons, such as isoparaffins and other branched substances, and cycloalkanes, such as cycloparaffins and other cyclic substances.

According to one embodiment, the polyolefin waxes can be functionalized with acid anhydrides, such as maleic anhydride. For example, such a wax is the wax "Ceridust 8020®" sold by Clariant.

The amide waxes can be prepared by reaction of a long-chain carboxylic acid (typically a fatty acid) with an amine, diamine or ammonia.

According to a specific embodiment, the amide wax comprises a diamide obtained from a diamine chosen from a $C_2$ to $C_{24}$ aliphatic diamine, a $C_6$ to $C_{18}$ cycloaliphatic diamine, a $C_6$ to $C_{24}$ aromatic diamine or their mixtures.

An aliphatic diamine can be linear or branched, preferably linear. Examples of linear aliphatic diamines which are suitable are 1,2-ethylenediamine, 1,3-propylenediamine, 1,4-tetramethylenediamine, 1,5-pentamethylenediamine, 1,6-hexamethylenediamine, 1,8-octamethylenediamine, 1,12-dodecamethylenediamine and their mixtures; preferably 1,2-ethylenediamine, 1,5-pentamethylenediamine and 1,6-hexamethylenediamine. Examples of branched aliphatic diamines which are suitable are 1,2-propylenediamine, 2,2-dimethyl-1,3-propanediamine, 2-butyl-2-ethyl-1,5-pentanediamine and their mixtures.

A cycloaliphatic diamine is a nonaromatic diamine comprising a ring, in particular a ring having six carbon atoms. A $C_6$ to $C_{18}$ cycloaliphatic diamine is a cycloaliphatic diamine comprising 6 to 18 carbon atoms. Examples of cycloaliphatic diamines which are suitable are 1,2-, 1,3- or 1,4-diaminocyclohexane, 2-methylcyclohexane-1,3-diamine, 4-methylcyclohexane-1,3-diamine, isophoronediamine, 1,2-, 1,3- or 1,4-bis(aminomethyl)cyclohexane, diaminodecahydronaphthalene, 3,3'-dimethyl-4,4'-diaminodicyclohexylmethane, 4,4'-diaminodicyclohexylmethane, bis(aminomethyl)norbornane and their mixtures; preferably, 1,3- or 1,4-bis(aminomethyl)cyclohexane, 1,2-, 1,3- or 1,4-bis(aminomethyl)cyclohexane, isophoronediamine and 4,4'-diaminodicyclohexylmethane.

An aromatic diamine is a diamine comprising an aromatic ring. A $C_6$ to $C_{24}$ aromatic diamine is an aromatic diamine comprising 6 to 24 carbon atoms. Examples of aromatic diamines which are suitable are meta- and para-phenylenediamine, meta- and para-xylylenediamine, meta- and para-toluylenediamine, 3,4'-diaminodiphenyl ether, 4,4'-diaminodiphenyl ether, 4,4'-diaminodiphenylmethane and their mixtures; preferably, meta- and para-xylylenediamine.

Preferably, the amide wax comprises a diamide obtained with at least one diamine chosen from a $C_2$ to $C_{24}$ aliphatic diamine, in particular a linear $C_2$ to $C_{18}$ aliphatic diamine, more particularly a linear $C_2$ to $C_{12}$ aliphatic diamine, more particularly still 1,2-ethylenediamine, 1,5-pentamethylenediamine or 1,6-hexamethylenediamine. According to a specific embodiment, the amide wax comprises a diamide obtained with at least one $C_2$ to $C_{36}$ carboxylic acid. The diamide can be obtained with a mixture of $C_2$ to $C_{36}$ carboxylic acids.

The carboxylic acid can be linear or branched, preferably linear. The carboxylic acid can be saturated or unsaturated, preferably saturated. The carboxylic acid can be unsubstituted or substituted, in particular hydroxylated. A hydroxylated carboxylic acid is a carboxylic acid substituted by one or two hydroxyl groups, preferably by one hydroxyl group.

According to a specific embodiment, the carboxylic acid can be a hydroxylated carboxylic acid, optionally as a mixture with an unsubstituted carboxylic acid. Suitable examples of hydroxylated carboxylic acids are 12-hydroxystearic acid (12-HSA), 9-hydroxystearic acid (9-HSA), 10-hydroxystearic acid (10-HSA), 14-hydroxyeicosanoic acid (14-HEA), 2,2-bis(hydroxymethyl)propionic acid, 2,2-bis(hydroxymethyl)butyric acid, hydroxyacetic acid (or glycolic acid), 2-hydroxypropionic acid (lactic acid), 2-hydroxy-3-(3-pyridyl)propionic acid, 3-hydroxybutyric acid, 2-hydroxybutyric acid, 2-methyl-2-hydroxybutyric acid, 2-ethyl-2-hydroxybutyric acid, hydroxypentanoic acid, hydroxyhexanoic acid, hydroxyheptanoic acid, hydroxyoctanoic acid, hydroxynonanoic acid, hydroxydecanoic acid and their mixtures; preferably, 12-hydroxystearic acid or a binary or ternary mixture of 12-hydroxystearic acid with the other abovementioned hydroxylated acids.

Suitable examples of unsubstituted carboxylic acids are acetic acid, propionic acid, butyric acid, pentanoic acid, hexanoic acid, heptanoic acid, octanoic acid, nonanoic acid, decanoic acid, lauric acid, myristic acid, palmitic acid, stearic acid, eicosanoic acid, palmitoleic acid, oleic acid, 11-eicosenoic acid, erucic acid, nervonic acid, linoleic acid, α-linolenic acid, γ-linolenic acid, dihomo-γ-linolenic acid, arachidonic acid, eicosapentaenoic acid, docosahexaenoic acid and their mixtures; preferably decanoic acid.

Preferably, the amide wax comprises a diamide obtained with at least one carboxylic acid chosen from a $C_2$ to $C_{22}$ carboxylic acid, in particular a hydroxylated $C_2$ to $C_{22}$ carboxylic acid and optionally an unsubstituted $C_2$ to $C_{22}$ carboxylic acid, more particularly a hydroxylated $C_{12}$ to $C_{20}$ carboxylic acid and optionally an unsubstituted $C_2$ to $C_{14}$ carboxylic acid.

According to a preferred embodiment, the amide wax comprises a diamide obtained by reaction between 1,2-ethylenediamine or 1,6-hexamethylenediamine and 12-hydroxystearic acid or optionally decanoic acid.

The amide waxes can be compounds prepared by reaction of ammonia or ethylenediamine with saturated and/or unsaturated fatty acids, such as stearic acid, tallow fatty acid, palmitic acid or erucic acid. The amide waxes also can include amide compounds, such as N,N'-ethylenedistearamide. For example, such a wax is the wax "Crayvallac WN1265®" sold by Arkema.

According to one embodiment, the polyolefin waxes can be mixed with amide waxes. For example, such waxes are: the wax "Crayvallac WN1135®" sold by Arkema or the wax "Ceridust 9615A®"—a mixture of polyethylene wax and amide wax—sold by Clariant.

According to one embodiment, the wax can be chosen from fatty acid derivatives, such as partially or completely esterified fatty acids. Preferably, they are fatty acids comprising at least 10 carbon atoms, preferably from 16 to 60 carbon atoms and more preferably from 24 to 36 carbon atoms. Preferably, they are saturated alkanemonocarboxylic acids which are preferably linear, such as montanic acid. Mention may be made, as example of this type of wax, of the wax "Ceridust 5551®" sold by Clariant.

Within the meaning of the present invention, the wax does not comprise salts of fatty acids comprising at least 10 carbon atoms, preferably from 16 to 60 carbon atoms and more preferably from 24 to 36 carbon atoms (also called "metal soaps").

Typically, they are salts of saturated alkanemonocarboxylic acids which are preferably linear, such as montanic acid and stearic acid. Typically, they are calcium and/or sodium and/or magnesium salts. For example, such waxes are the wax "Licomont NAV101®" sold by Clariant, calcium stearate and/or magnesium stearate. It has been observed that the use of such a salt as wax, in combination with a semicrystalline thermoplastic, in particular elastomer, polymer powder, for example with a PEBA copolymer powder, does not make it possible to increase the working window or to ensure good cohesion of the bed.

However, it is possible to use such a salt as additives in sc TP polymer powders used in sintering, for example to improve the flow, as described in US 2006/0189784, or to reduce the thermal stress during the sintering, as described in US 2008/0300353.

According to one embodiment, the wax in the composition of the invention is nonionic.

The wax can be a mixture of the functionalized ester wax with an alcohol. Mention may be made of the wax "Licolub WE 40®" sold by Clariant.

The vegetable waxes can comprise, for example, derivatives of functionalized or nonfunctionalized castor oil. Mention may be made, as wax derived from castor oil, of the wax "Crayvallac PC®" sold by Arkema and the wax "Jagrowax 100®" sold by Jayant Agro-Organics.

According to the invention, the wax has a dropping point which is greater than the crystallization temperature (Ct) of the sc TP polymer.

The term "dropping point" is understood to mean the temperature at which the wax changes from a semisolid state to the liquid state under specific test conditions. The dropping point is measured according to the standard ASTM D 3954-1994 (2004).

Preferably, the wax according to the invention can have a dropping point which is greater than the Mp of the sc TP polymer by at most 30° C. and preferably by at most 20° C. For example, this difference can be from 1 to 5° C.; or from 5 to 10° C.; or from 10 to 15° C.; or from 15 to 20° C.; or from 20 to 25° C.; or from 25 to 30° C.

In particular, the wax can have a dropping point of from 60 to 180° C. and preferably from 80 to 175° C. For example, this dropping point can be from 60 to 65° C.; or from 65 to 70° C.; or from 70 to 75° C.; or from 75 to 80° C.; or from 80 to 85° C.; or from 85 to 90° C.; or from 90 to 95° C.; or from 95 to 100° C.; or from 100 to 105° C.; or from 105 to 110° C.; or from 110 to 115° C.; or from 115 to 120° C.; or from 120 to 125° C.; or from 125 to 130° C.; or from 130 to 135° C.; or from 135 to 140° C.; or from 140 to 145° C.; or from 145 to 150° C.; or from 150 to 155° C.; or from 155 to 160° C.; or from 160 to 165° C.; or from 165 to 170° C.; or from 170 to 175° C.; or from 175 to 180° C.

The present invention proposes to use a specific wax, the dropping point of which is greater than the Ct of the sc TP polymer. Thus, the wax is in the molten or at least partially molten state at the temperature of the powder bed, and can increase the cohesion of the sc TP polymer powders by a kind of sticking, which has the result of increasing the stiffness of the powder bed and makes it possible to prevent the part from sinking into the bed.

Typically, the dropping point of the wax is greater than the Ct of the sc TP polymer by at least 5° C., preferably by at least 10° C., preferably by at least 15° C. and more preferably by at least 20° C. For example, this temperature difference can be from 5 to 10° C.; or from 10 to 15° C.; or from 15 to 20° C.; or from 20 to 25° C.; or from 25 to 30° C.; or from 30 to 35° C.; or from 35 to 40° C.; or from 40 to 45° C.; or from 45 to 50° C.

Composition of the Powder

According to the present invention, the composition of the powder is semicrystalline, namely the transformation into a powder of the sc TP polymer and the preparation of the composition as a powder do not affect the semicrystalline nature of the sc TP polymer as defined above.

The composition according to the invention can comprise the sc TP polymer(s) in a proportion by weight preferably of greater than or equal to 80%, or greater than or equal to 81%, or greater than or equal to 82%, or greater than or equal to 83%, or greater than or equal to 84%, or greater than or equal to 85%, or greater than or equal to 86%, or greater than or equal to 87%, or greater than or equal to 88%, or greater than or equal to 89%, or greater than or equal to 90%, or greater than or equal to 91%, or greater than or equal to 92%, or greater than or equal to 93%, or greater than or equal to 94%, or greater than or equal to 95%, or greater than or equal to 96%, or greater than or equal to 97%, or greater than or equal to 98%, or greater than or equal to 99%, or greater than or equal to 99.1%, or greater than or equal to 99.2%, or greater than or equal to 99.3%, or greater than or equal to 99.4%, or greater than or equal to 99.5%, or greater than or equal to 99.6%, or greater than or equal to 99.7%, or greater than or equal to 99.8%, or greater than or equal to 99.9%, or greater than or equal to 99.91%, or greater than or equal to 99.92%, or greater than or equal to 99.93%, or greater than or equal to 99.94%, or greater than or equal to 99.95%, or greater than or equal to 99.96%, or greater than or equal to 99.97%, or greater than or equal to 99.98%, or greater than or equal to 99.99%.

Typically, the particles of sc TP polymer can have a size Dv50 from 40 to 150 µm and preferably from 50 to 100 µm. For example, the size Dv50 of the sc TP polymer particles can be from 40 to 45 µm; or from 45 to 50 µm; or from 50 to 55 µm; or from 55 to 60 µm; or from 60 to 65 µm; or from 65 to 70 µm; or from 70 to 75 µm; or from 75 to 80 µm; or from 80 to 85 µm; or from 85 to 90 µm; or from 90 to 95 µm; or from 95 to 100 µm; or from 100 to 105 µm; or from 105 to 110 µm; or from 110 to 115 µm; or from 115 to 120 µm; or from 120 to 125 µm; or from 125 to 130 µm; or from 130 to 135 µm; or from 135 to 140 µm; or from 140 to 145 µm; or from 145 to 150 µm.

Typically, the composition comprises a wax at a content of 0.1% to 20% by weight of the total composition, preferably of 0.5% to 10% and more preferably of 0.5% to 5% by weight. Thus, this content can be from 0.1% to 0.2%; or from 0.2% to 0.3%; or from 0.3% to 0.4%; or from 0.4% to 0.5%; or from 0.5% to 1%; or from 1% to 2%; or from 2% to 4%; or from 4% to 6%; or from 6% to 8%; or from 8% to 10%; or from 10% to 12%; or from 12% to 14%; or from 14% to 16%; or from 16% to 18%; or from 18% to 20%.

The wax can be present in the composition in the form of wax particles. Typically, the wax particles have a mean size (Dv50) of 1 to 30 µm, preferably of 1 to 20 µm and more preferably of 5 to 15 µm.

Preferably, a wax is chosen, the mean size (Dv50) of which is less than that of the sc TP polymer in the composition.

The wax can also have a size Dv90 of less than 50 µm and preferably of less than 20 µm. For example, the size Dv90 of the wax particles can be from 5 to 20 µm; or from 5 to 15 µm.

In the context of the present patent application:
the Dv50 corresponds to the threshold of the particle size for which 50% of the particles (by volume) have a size of less than the threshold, and 50% of the particles (by volume) have a size of greater than the threshold;
the Dv90 corresponds to the threshold of the particle size for which 90% of the particles (by volume) have a size of less than the threshold, and 10% of the particles (by volume) have a size of greater than the threshold.

The Dv50 and the Dv90 are measured according to the standard ISO 9276—Parts 1 to 6: "Representation of results of particle size analysis". It is possible to use, for example, a laser particle sizer (Sympatec Helos) and software (Fraunhofer) to obtain the volumetric distribution of a powder and to deduce the Dv50 and the Dv90 therefrom.

According to one embodiment, the wax is present in the composition in the form of a coating at least partially covering the particles of the sc TP polymer powder.

Flow Agent

According to one embodiment, the composition according to the invention comprises one or more flow agents.

The term "flow agent" is understood to mean an agent which makes it possible to improve the flowability as well as the leveling of the powder of semicrystalline thermoplastic polymers during the sintering process.

It has been observed that the presence of flow agent in a composition based on sc TP polymer can reduce the working window, which makes building more difficult. Furthermore, the problem of cohesion of the bed is encountered more often when a flow agent is employed.

The use of the wax in the composition of the invention proves to be particularly advantageous in these cases: it makes it possible to widen the working window and also to avoid the problem of the cohesion of the bed, thus making it possible to carry out building more easily.

The flow agent can be chosen from those commonly used in the field of the sintering of powders of sc TP polymers. It is, for example, chosen from: silicas, in particular precipitated silicas, hydrated silicas, vitreous silicas, fumed silicas or pyrogenic silicas; glassy oxides, in particular glassy phosphates or glassy borates, alumina, such as amorphous alumina, $TiO_2$, calcium silicates, magnesium silicates, such as talc, mica, kaolin, attapulgite and their mixtures.

The flow agent is generally present in the composition at a content of less than or equal to 5% by weight of the total composition, preferably of less than or equal to 3%. Typically, this content can be from 0.1% to 2.5%, for example, from 0.1% to 2%, preferably from 0.5% to 2%, or from 0.5% to 1.5%.

The flow agent is generally in the form of a powder, preferably of substantially spherical shape.

The flow agent in the composition of the powder can be in the form of particles having a mean size (Dv50) of less than or equal to 20 µm, preferably of less than or equal to 15 µm, preferably of less than or equal to 10 µm and more preferably of less than or equal to 1 µm. For example, the size Dv50 of the particles of the flow agent can be from 10 nm to 100 nm, from 100 nm to 1 µm, from 1 µm to 20 µm.

Other Additives

The composition according to the invention can comprise any type of additive suitable for the powders of sc TP polymers used in sintering: in particular additives (in or not in the powder form) which contribute to improving the properties of the powder for its use in agglomeration technology and/or additives making it possible to improve the properties, for example the mechanical properties (for example modulus, elongation at break, impact strength) or also the esthetic properties (color), of the three-dimensional parts manufactured.

According to an advantageous embodiment, the composition according to the invention can comprise inorganic additives, for example carbonate-based inorganic substances, in particular calcium carbonate, magnesium carbonate, dolomite or calcite, barium sulfate, calcium sulfate, dolomite, alumina hydrate, wollastonite, montmorillonite, zeolite, perlite, nanofillers (fillers of the order of a nanometer), such as nanoclays or carbon nanotubes, carbon black, glass fibers, carbon fibers, organic additives, such as polymer powders having a melting point greater than the maximum temperature experienced by the composition during the layer-by-layer building process, in particular those with a modulus of greater than 1000 MPa. According to one embodiment, the composition is devoid of inorganic additives and organic additives.

The additives of the abovementioned type can be present in the composition of the powder (including those present, if appropriate, in the sc TP polymer powders) at a content by weight of less than or equal to 60%, preferably of less than or equal to 30%, more preferably of less than or equal to 1%, for example at a content by weight of from 0.05% to 60%; or from 1% to 30%; or from 1% to 20%; or from 1% to 10%.

The composition of the invention can also comprise dyes, pigments for coloring, pigments for infrared absorption, fireproofing additives, stabilizers, antioxydants, light stabilizers, impact modifiers, antistatic agents, flame retardants and their mixtures. These additives are preferably in the form of a powder with a Dv50 of less than 20 µm. These additives can be present in the composition at a content of from 0.05% to 5%.

The additives can be mixed with the sc TP polymer before and/or after the grinding stage described above.

Process for the Preparation of the Composition

The composition according to the invention comprises powders of semicrystalline thermoplastic polymer and of at least one wax.

The process for the preparation of the composition of the present invention comprises a stage where the sc TP polymer is brought into contact with the wax and optionally a flow agent.

The sc TP polymers which can be used in the context of the invention are for the most part commercially available, in particular in the form of granules, flakes or coarse powder, which can be easily transformed into powder by means of known processes.

Generally, the sc TP polymer powder can be obtained by a grinding process.

Preferably, the sc TP polymer brought into contact with the wax is in powder form; alternatively, in the form of granules, flakes or coarse powder, for example having a size Dv50 of greater than 250 µm (in this case, a grinding and/or sieving stage can be carried out).

According to one embodiment, the operation of bringing the sc TP polymer into contact with the wax is carried out by dry mixing, that is to say mixing in the absence of solvent.

According to one embodiment, the operation of bringing the sc TP polymer into contact with the wax is carried out according to the following stages:
  by dissolving the wax in a suitable solvent, in order to form a wax solution in order to form a wax solution;
  by mixing said wax solution with the sc TP polymer, in order to form a dispersion; and
  by removing the solvent from said dispersion, for example by evaporation, in order to obtain the wax-coated sc TP polymer.

The appropriate solvent can be a solvent known to a person skilled in the art to be able to dissolve a wax, for example acetone, ethanol and/or a solvent comprising water and a surfactant.

The preparation process can comprise a grinding stage in order to obtain a sc TP polymer powder with the desired particle size.

The grinding stage can be carried out before and/or after bringing the sc TP polymer into contact with the wax.

Preferably, the grinding is a cryogenic grinding known to a person skilled in the art. Thus, in a first step, the sc TP polymer (or the mixture of sc TP polymer and wax) is cooled to a temperature below the glass transition temperature of the sc TP polymer. This temperature can be from 10 to 50° C. lower than the glass transition temperature of the sc TP polymer. Thus, the mixture can be cooled to a temperature of less than or equal to −10° C., preferably of less than or equal to −50° C. and more preferably of less than or equal to −80° C.

The cooling of the sc TP polymer (or of the mixture of sc TP polymer and wax) can be carried out, for example, with liquid nitrogen, or with liquid carbon dioxide or with dry ice, or with liquid helium.

The grinding stage can be carried out in a pin mill, a hammer mill or a whirl mill.

The process for the preparation of the composition according to the invention can subsequently comprise a sieving stage. The sieving can be carried out on a sieve.

Alternatively, after grinding, the preparation process can comprise a selection stage in order to obtain the desired particle size profile. Typically, the powders can be dispersed by a selection wheel and transported by classification air. The dust entrained in the air is conveyed through a support wheel and discharged via a first outlet. The coarse product is rejected by a classifying wheel and transported to a second outlet. The selector can comprise several successive wheels working in parallel.

When the abovementioned additives (including the flow agent) are present in the composition, the sc TP polymer (or the mixture of sc TP polymer and wax) is brought into contact with the additives in the powder form (i.e. in the form of a simple mixture) before or after the grinding and/or sieving stage.

According to a specific form, certain specific additives, such as the inorganic additives, can be incorporated in the sc TP polymer powders by compounding, in particular at the stage of the manufacture of the sc TP polymer granules intended to be ground.

Moreover, for certain specific sc TP polymers, for example polyamides, a dissolution-precipitation process can be envisaged for the powder preparation. In this specific case, the wax can be introduced during the dissolution-precipitation process.

Process for the Sintering of the Composition

The composition, as described above, is used for a process for the layer-by-layer building of 3D articles by sintering brought about by electromagnetic radiation, for example infrared or ultraviolet radiation or preferably a laser.

According to the process, a thin layer of powder is deposited on a horizontal plate maintained in a chamber heated to a temperature called the build temperature. The term "build temperature" (also called "temperature of the bed") denotes the temperature to which the bed of powder, of a constituent layer of a three-dimensional object under build-up, is heated during the process for the layer-by-layer sintering of the powder. This temperature can be lower than the melting point of the sc TP polymer by less than 50° C., preferably by less than 40° C. and more preferably by 20° C. approximately. The electromagnetic radiation subsequently contributes the energy necessary to sinter the powder particles at different points of the powder layer according to a geometry corresponding to an object (for example using a computer having in memory the shape of an object and recreating the latter in the form of slices).

Subsequently, the horizontal plate is lowered by a value corresponding to the thickness of a powder layer, and a fresh layer is deposited. The electromagnetic radiation contributes the energy necessary to sinter the powder particles according to a geometry corresponding to this new slice of the object, and so on. The procedure is repeated until the object has been manufactured.

Preferably, the powder layer deposited on a horizontal plate (before sintering) can have a thickness of from 20 to 200 μm and preferably from 50 to 150 μm. The layer of agglomerated material, after sintering, can have a thickness of from 10 to 150 μm and preferably from 30 to 100 μm.

Preferably, the composition of the invention is used in a selective laser sintering (SLS) process. The composition can also be used in a sintering process of the MJF (Multi Jet Fusion) and HSS (High Speed Sintering) type.

The powder composition according to the invention thus makes it possible to manufacture three-dimensional articles of good quality, having good mechanical properties and precise and well-defined dimensions and contours.

The powder composition, as described above, can be recycled and reused in several successive build-ups. It can, for example, be used as it is or as a mixture with other powders, which are or are not recycled.

The following examples illustrate the invention without limiting it.

EXAMPLES

Example 1

Various powders of PEBA copolymers are optionally mixed with a flow agent (silica) at a content of 1% (for polymer A) or 0% (for polymer B) by weight and optionally with a wax at a content of 1% by weight.

The table below comprises the different PEBAs used in the context of this example.

TABLE 1

Composition of the polymers used

|  | PEBA polymers | |
| --- | --- | --- |
|  | A | B |
| Polyamide blocks | PA 11 | PA 12 |
| Molar mass of the polyamide blocks (g/mol) | 600 | 5000 |
| Polyether blocks | PTMG | PTMG |
| Molar mass of the polyether blocks (g/mol) | 1000 | 250 |
| Ratio by weight | 0.6 | 20 |
| Crystallization temperature Ct (° C.) | 68 | 130 |

Thus, the polymers A and B were mixed with flow agent and with a wax so as to form the compositions 1 to 11. These compositions were used for the manufacture of three-dimensional articles.

TABLE 2

Composition of polymer powder and wax which were studied

| Composition | Polymer | Wax | Dropping point of the wax (° C.) | Observation during the passage through the machine |
| --- | --- | --- | --- | --- |
| 1 | A | — | — | Sinking of the object |
| 2 | A | Crayvallac WN1135 | 151 | OK |
| 3 | A | Crayvallac WN1495 | 110 | OK |
| 4 | A | Crayvallac WN1265 | 145 | OK |
| 5 | A | Ceridust 9615A | 140 | OK |
| 6 | A | Ceridust 8020 | 74 | OK |
| 7 | B | — | — | Sinking of the object |
| 8 | B | Ceridust 9615A | 140 | OK |
| 9 | B | Ceridust 8020 | 74 | Powder agglomerates |
| 10 (composition without wax) | A | sodium montanate | 75 | Sinking of the object |
| 11 (composition without wax) | A | calcium stearate and magnesium stearate | 125 | Sinking of the object |

It was observed that the presence of wax having a dropping point greater than the Ct of the polymer makes it possible for the composition to pass through a sintering machine so as to obtain 3D articles (compositions 2 to 6 and 8). The absence of wax does not make it possible for the composition to pass through the sintering machine (compositions 1 and 7). In the case of the composition 9, it was found that, when the dropping point of the wax is lower than the Ct of the polymer, the manufacture of 3D articles was not possible.

In the case of the wax-free compositions 10 and 11, it was found that the use of the salts did not make it possible to increase the working window or to ensure the cohesion of the bed; the manufacture of 3D articles was not possible.

Example 2

A PA 12 powder is mixed with silica at a content of 0.15%. This powder has a Mp equal to 180° C. and a Ct equal to 147° C., which are measured according to the standard ISO 11357.

This powder is dry mixed with a wax so as to form the compositions 1 and 2. These compositions were used for the manufacture of three-dimensional articles.

The wax used is a polyhydroxyalkanoate (PHA), which product is sold under the brand name Ceraflour 1000® by BYK.

| Composition | Polymer | Wax (dropping point = 175° C.) |
|---|---|---|
| 1 | PA 12 | 0% |
| 2 | PA 12 | 2.0% |

The working window is determined for the compositions 1 and 2.

| Composition | Working window |
|---|---|
| 1 | 161-163° C. |
| 2 | 155-163° C. |

For the composition 1, a sinking of the parts is observed below 160° C.

The composition 2 makes possible a building of three-dimensional objects over a wider temperature range; thus this formulation has a greater working window.

Furthermore, it has been observed that the addition of the wax accelerates the crystallization of the polymer, namely the crystallization temperature becomes higher. This effect is visible by melting the polymer at 220° C. and by then observing the isothermal crystallization in DSC at 160° C. It is seen that the rate of crystallization of the composition 2 is greater than that of the wax-free composition 1. Surprisingly, even though the crystallization temperature is higher, the presence of wax makes it possible however to carry out the printing below 160° C.

The invention claimed is:

1. A composition for the layer-by-layer building of a three-dimensional (3D) article by sintering of the composition brought about by electromagnetic radiation, the composition comprising:
   a semicrystalline thermoplastic polymer powder;
   a wax, the wax having a dropping point which is greater than the crystallization temperature (Ct) of the semicrystalline thermoplastic polymer; and
   wherein the wax is not a fatty acid comprising at least 10 carbon atoms or a metallic soap.

2. The composition as claimed in claim 1, in which the wax is chosen from polyolefin waxes, waxes of vegetable or animal origin, and also their mixtures.

3. The composition as claimed in claim 2, in which the wax is chosen from polyethylene and polypropylene waxes, polytetrafluoroethylene waxes, ketone waxes, acid waxes, partially esterified acid waxes, acid anhydride waxes, ester waxes, aldehyde waxes, amide waxes, their derivatives and also their mixtures.

4. The composition as claimed in claim 1, in which the semicrystalline thermoplastic polymer is chosen from a polyamide, a homopolymer or copolymer of vinylidene fluoride (PVDF), a copolymer comprising polyamide blocks and comprising polyether blocks (PEBA), a thermoplastic polyurethane (TPU), a copolymer comprising polyester blocks and comprising polyether blocks (COPE), and their mixtures.

5. The composition as claimed in claim 4, in which the semicrystalline thermoplastic polymer is an elastomer chosen from a PEBA, a TPU, a COPE, and their mixtures.

6. The composition as claimed in claim 4, in which the polyamide is chosen from polyamide (PA) 11, PA 12 or PA 6.

7. The composition as claimed in claim 4, in which the polyamide blocks of the PEBA are PA 6, PA 11, PA 12, PA 610, PA 1010 or PA 1012 blocks; and/or in which the polyether blocks of the PEBA are blocks resulting from PEG (polyethylene glycol), PPG (propylene glycol), PO3G (polytrimethylene glycol) or PTMG (polytetrahydrofuran).

8. The composition as claimed in claim 1, in which the wax is present at a content of 0.1% to 20% by weight of the total composition.

9. The composition as claimed in claim 1, in which the dropping point of the wax is greater than the crystallization temperature of the semicrystalline thermoplastic polymer by at least 5° C.

10. The composition as claimed in claim 1, in which the dropping point of the wax is greater than the melting point of the semicrystalline thermoplastic polymer by at most 30° C.

11. The composition as claimed in claim 1, in which the flow agent is present at a content of less than or equal to 5% by weight of the total composition.

12. The composition as claimed in claim 11, in which the flow agent is chosen from: silicas, hydrated silicas, vitreous silicas, fumed silicas or pyrogenic silicas; glassy oxides, glassy phosphates or glassy borates, alumina, amorphous alumina, $TiO_2$, calcium silicates, magnesium silicates, talc, mica, kaolin, attapulgite and their mixtures.

13. A method of using the composition as claimed in claim 1, for the layer-by-layer building of a 3D article by sintering of the composition brought about by electromagnetic radiation.

14. The method as claimed in claim 13, further comprising reusing the composition to create successive layers of the 3D article.

15. A 3D article manufactured from the method of claim 13.

16. A method of increasing cohesion of a bed of semicrystalline thermoplastic polymer powder for sintering processes, the method comprising adding a wax to the bed of a semicrystalline thermoplastic polymer powder, wherein the wax is not a fatty acid salt comprising at least 10 carbon atoms or a metallic soap, in which the wax has a dropping point which is greater than a crystallization temperature (Ct) of the semicrystalline thermoplastic polymer.

17. A method of improving the recyclability of semicrystalline thermoplastic polymer powders used for sintering processes, the method comprising adding a wax to the semicrystalline thermoplastic polymer powders, wherein the wax is not a fatty acid salt comprising at least 10 carbon atoms or a metallic soap, in which the wax has a dropping point which is greater than a crystallization temperature (Ct) of the semicrystalline thermoplastic polymer.

18. The composition as claimed in claim 2, in which the wax is chosen from polyethylene and polypropylene waxes, polytetrafluoroethylene waxes, ketone waxes, acid waxes, partially esterified acid waxes, acid anhydride waxes, ester waxes, aldehyde waxes, their derivatives and also their mixtures.

19. The composition as claimed in claim 1, further comprising a flow agent.

* * * * *